(12) United States Patent
Andonieh et al.

(10) Patent No.: US 10,236,964 B2
(45) Date of Patent: Mar. 19, 2019

(54) METHOD AND APPARATUS FOR BEAMFORMING TRAINING IN BASIC SERVICE SET DISCOVERY

(71) Applicant: PERASO TECHNOLOGIES INC., Toronto (CA)

(72) Inventors: Joseph Andonieh, Aurora (CA); Bradley Robert Lynch, Toronto (CA); Gary Cheng, Unionville (CA); Christopher James Hansen, Los Altos, CA (US)

(73) Assignee: PERASO TECHNOLOGIES INC., Toronto (CA)

( * ) Notice: Subject to any disclaimer, the term of this patent is extended or adjusted under 35 U.S.C. 154(b) by 0 days.

(21) Appl. No.: 15/655,463

(22) Filed: Jul. 20, 2017

(65) Prior Publication Data
US 2018/0026700 A1 Jan. 25, 2018

Related U.S. Application Data

(60) Provisional application No. 62/365,572, filed on Jul. 22, 2016.

(51) Int. Cl.
*H04B 7/06* (2006.01)
*H04W 16/28* (2009.01)
*H04W 84/12* (2009.01)

(52) U.S. Cl.
CPC ......... *H04B 7/0665* (2013.01); *H04B 7/0617* (2013.01); *H04B 7/0619* (2013.01); *H04B 7/0695* (2013.01); *H04W 16/28* (2013.01); *H04W 84/12* (2013.01)

(58) Field of Classification Search
CPC .. H04B 7/0665; H04B 7/0617; H04B 7/0619; H04W 84/12
USPC .......................................................... 375/267
See application file for complete search history.

(56) References Cited

U.S. PATENT DOCUMENTS

| | | | | |
|---|---|---|---|---|
| 2007/0286303 | A1* | 12/2007 | Yamaura | H04B 7/0421 375/267 |
| 2010/0103045 | A1* | 4/2010 | Liu | H04B 7/0617 342/372 |
| 2010/0214169 | A1* | 8/2010 | Kafle | H01Q 3/26 342/368 |
| 2015/0365156 | A1* | 12/2015 | Huang | H04W 72/1231 370/329 |
| 2016/0191132 | A1 | 6/2016 | Rajagopal et al. | |
| 2017/0118656 | A1* | 4/2017 | Xin | H04W 16/28 |
| 2017/0317726 | A1* | 11/2017 | Abdallah | H04B 17/318 |

OTHER PUBLICATIONS

EPO, Extended European Search Report, dated Aug. 11, 2017, re European Patent Application No. 17182223.2.

(Continued)

*Primary Examiner* — Michael R Neff
(74) *Attorney, Agent, or Firm* — Perry + Currier Inc.

(57) ABSTRACT

A method and apparatus for beamforming training in basic service set discovery is provided. Beacon data is transmitted from a first wireless communication device, the beacon data comprising: beacon data parameters for operation of a basic service set: and beamforming data that includes receive beamforming training fields. Beamforming occurs with a second wireless communication device that receives beacon data.

20 Claims, 12 Drawing Sheets

(56) References Cited

OTHER PUBLICATIONS

IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements for Very High Throughput in the 60 GHz Band, in IEEE Std 802.11ad-2012 (Amendment to IEEE Std 802.11-2012, as amended by IEEE Std 802.11ae-2012 and IEEE Std 802.11aa-2012), vol., No., pp. 1-628, Dec. 28, 2012 doi: 10.1109/IEEESTD.2012.6392842.

Nitsche, Thomas, et al. "IEEE 802.11 ad: directional 60 GHz communication for multi-Gigabit-per-second Wi-Fi." IEEE Communications Magazine 52.12 (2014): 132-141.

* cited by examiner

METHOD AND APPARATUS FOR BEAMFORMING TRAINING IN BASIC SERVICE SET DISCOVERY

CROSS-REFERENCE TO RELATED APPLICATIONS

This application claims priority from U.S. provisional patent application No. 62/365,572 filed Jul. 22, 2016. The contents of the above application are incorporated herein by reference.

FIELD

The specification relates generally to wireless communications, and specifically to a method and apparatus for a method and apparatus for beamforming training in basic service set discovery.

BACKGROUND

Wireless communications between an access point and wireless communication devices can be highly directional, especially when the access point and wireless communication devices communicate according to protocols that use higher frequencies, such as 60 GHz used with the 802.11ad and 802.11ay protocols. However, in a discovery mode and/or while scanning, which in the 802.11ad and 802.11ay protocols may be referred to as a sending or receiving Beacons and/or DMG (Directional Multi-Gigabit) Beacons during Beacon Transmission Interval (BTI), access points and/or wireless communication devices broadcast and receive in an omni-directional mode and/or quasi-omni-directional mode so that the wireless communication devices may discover an access point to form a basic service set. As such access points and/or wireless communication devices generally include respective antenna arrays having sectors that can be operated in an omni (and/or quasi-omni) mode and a directional mode. Once an initial discovery occurs in an omni mode and/or in a BTI, an access point and a wireless communication device generally attempt to "train" each other to communicate effectively, for example by using beamforming training ("TRN") fields which are exchanged in an Association Beamforming Training (A-BFT) interval. However, such beamforming training can be inefficient as it generally occurs in a dedicated beamforming training interval. Furthermore, when the A-BFT fails (e.g. no sector sweeps are received at the access point from a wireless communication device in the A-BFT), the BTI and A-BFT intervals are repeated after a data transmission interval (DTI) in which the access point is not performing beam training. Furthermore, as a network becomes more dense (e.g. a point coordinator, such as an access point, is attempting to communicate with increasing number of wireless communications devices), more A-BFT intervals may be added to improver access to A-BFT, but which results in the DTI being shortened. For example, the 802.11ad protocol allows for up to eight A-BFT intervals. Furthermore, collisions may occur in dense networks (and/or anytime an access point is attempting to communicate with two or more wireless communication devices).

SUMMARY

An aspect of the specification provides a method in a wireless communications assembly of an first wireless communication device for establishing communications with a second wireless communication device in a wireless network, comprising: transmitting beacon data from the first wireless communication device, the beacon data comprising: beacon data parameters for operation of a basic service set: and beamforming data that includes receive beamforming training fields; and beamforming with the second wireless communication device.

Another aspect of the specification provides a wireless communications assembly of a first wireless communication device for establishing communications with a second wireless communication device in a wireless network, the wireless communications assembly comprising: a controller and an antenna array, the controller configured to: transmit beacon data from the first wireless communication device, the beacon data comprising: beacon data parameters for operation of a basic service set: and beamforming data that includes receive beamforming training fields; and beamform with the second wireless communication device.

Another aspect of the specification provides a method in a wireless communications assembly of a station for establishing communications with an access point in a wireless network, comprising: receiving a beacon data frame from the access point, the beacon data frame defining an association beamforming training (A-BFT) interval followed by a data transmission interval (DTI); initiating a beamforming process during the A-BFT interval; responsive to a failure of the beamforming process, transmitting a plurality of sector sweep (SSW) frames to the access point during the DTI.

Another aspect of the specification provides a method in a wireless communications assembly of an access point for establishing communications with a station in a wireless network, comprising: transmitting a beacon data frame from the access point, the beacon data frame defining an association beamforming training (A-BFT) interval followed by a data transmission interval (DTI); receiving a portion of a set of sector sweep (SSW) frames from the station during the A-BFT interval, indicating a failed beamforming process initiated by the station; responsive to the failed beamforming process, allocating an additional A-BFT interval to the station during the DTI, by sending a frame addressed to the station and defining the additional A-BFT interval; and receiving an additional set of SSW frames from the station during the additional A-BFT interval.

Another aspect of the specification provides a method in a wireless communications assembly of a station for establishing communications with an access point in a wireless network, comprising: receiving a beacon data frame from the access point, the beacon data frame defining an association beamforming training (A-BFT) interval followed by a data transmission interval (DTI), and including a beamforming training field containing a plurality of complementary sequences; initiating a beamforming process during the A-BFT interval; responsive to a failure of the beamforming process, transmitting a control data frame including at least one of (i) a further training field containing a further plurality of complementary sequences, and (ii) a sector sweep feedback field identifying an antenna sector selected based on the beamforming training field of the beacon data frame.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
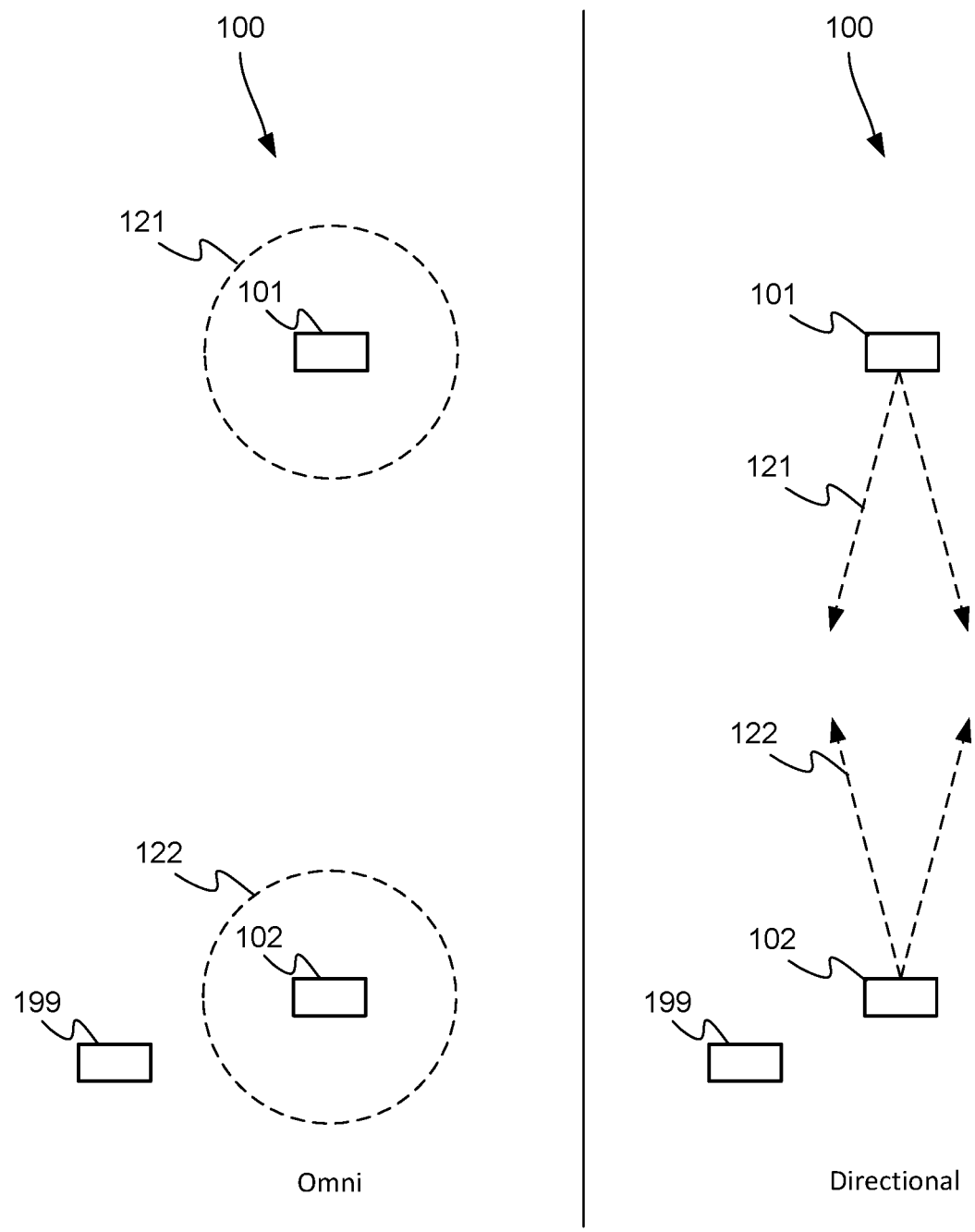
FIG. 1 depicts a wireless communications system, showing omni modes and directional modes in devices thereof, according to non-limiting implementations.

FIG. 1 depicts different modes of devices in a wireless communications system 100, including a wireless service set that includes wireless communication devices 101 and 102 (interchangeably referred to, respectively, as the device 101 and the device 102). As depicted, each of the devices 101, 102 may respectively operate in one of two modes: an omni mode, in which the devices 101, 102 transmit and receive omni-directionally and/or quasi-omni-directionally using respective beams 121, 122 which have transmission angle and/or a receive angle of up to 360° (and/or over angles and/or all angles over which respective antenna arrays may transmit and receive); and a directional mode in which the respective beams 121, 122 of the devices 101, 102 are narrowed in one or more directions. For convenience, hereafter the term "omni" will be used interchangeably with the term "quasi-omni"; for example, the term "omni mode" may refer to an omni mode and/or a quasi-omni mode, and similarly, the term "omni-directional may refer to an omni-directional and/or a quasi-omni-directional. The devices 101, 102 may alternatively be referred to as stations.

As depicted, the system 100 further includes a third wireless communication device 199 (and/or station) that may also attempt to operate a service set with the device 101, which may be the same or different service set as the device 101 operates with the device 102. While a respective beam of the device 199 is not depicted, the device 199 may operate in a manner similar to the device 102 and/or be similar to the device 102. Hence, structure, components, configuration and/or functionality of the device 102 as described hereafter will also be applicable to the device 199.

As described herein, the device 101 comprises a point coordinator, including, but not limited to, an access point, a PCP (point coordinator of a personal basic service set), and the like and the device 102 comprises a device which may access the Internet, and the like, using the point coordinator and/or access point and/or the PCP of the device 101, and or operate in a service set with the device 101. Hence, the devices 101, 102 will attempt to operate a service set, as described in more detail below. The nature and population of the service set to be operated are not particularly limited. As will be apparent to those skilled in the art, the service set may be a personal basic service set (PBSS) consisting of at least a pair of wireless communication devices (e.g. devices 101, 102) in communication with each other. In other examples, the service set may be a basic service set (BSS) such as an infrastructure BSS including an access point (e.g. at least one of the devices 101, 102 is an access point) or an independent BSS.

It is assumed, in the system 100, that the devices 101, 102 are each using a same and/or similar frequency to communicate. For example, the devices shown in FIG. 1 may each be implementing the IEEE 802.11ad (WiGig) standard or enhancements thereof (e.g. 802.11ay, alternatively referred to as EDMG (Enhanced Directional Multi-Gigabit), and therefore all transmit and receive data at frequencies around 60 GHz. Hence, the beams 121, 122 each include data transmitted at, or around, 60 GHz. At such frequencies, the beams 121, 122 are highly susceptible to interference from structures between the devices 101, 102 (e.g. buildings, etc., not depicted). The devices 101, 102 are therefore configured to perform certain actions to refine the direction of the beams 121, 122 and/or improve communications therebetween, which can lead to a decrease in their susceptibility to interference, for example by performing beamforming training in basic service set discovery of respective antenna arrays using frames.

Each of the devices 101, 102 can comprise one or more of a mobile device or a non-mobile device, which includes, but is not limited to, any suitable combination of electronic devices, communication devices, computing devices, portable electronic devices, wireless adapters, wireless USB (Universal Serial Bus) adapters, mobile computing devices, portable computing devices, tablet computing devices, laptop computers, PDAs (personal digital assistants), cellphones, smartphones, e-readers, mobile camera devices, personal computers, work stations, access points, servers, media servers, telephones, and the like. Indeed, any device that communicates wirelessly and which can perform beamforming training (e.g. and hence includes an antenna array) is within the scope of present implementations.

However, in particular, the device 101 comprises an access point. However, the device 101 need not be a dedicated access point, but a device which may operate as an access point while performing other functionality.

The device 102 may also comprise an access point, and the like attempting to operate a service set with the access point, and the like, of the device 101. However, in example implementations described herein, the device 102 will be assumed to be a mobile communication device such as a smartphone and the like.

Figure 2:
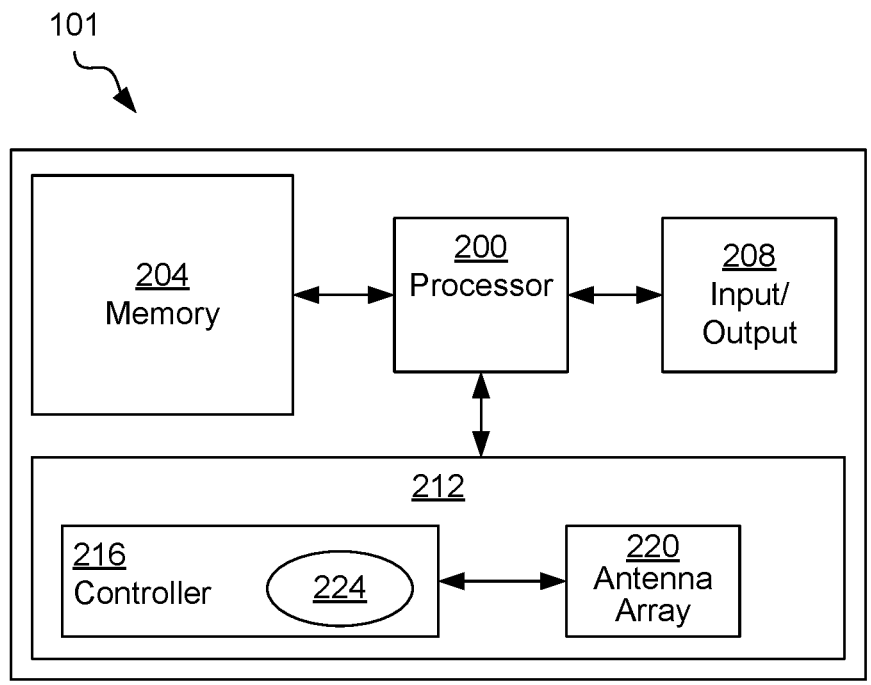
FIG. 2 depicts a block diagram of a device of the system of FIG. 1, according to non-limiting implementations.

Turning now to FIG. 2, before describing the operation of the devices of the system 100 to implement beamforming training in basic service set discovery mentioned above, certain components of the device 101 will be described. The description of the device 101 below also applies to the device 102. That is, the devices 101, 102 each include the components discussed below, though it will be understood that the particular implementation of each component may vary from device to device.

The device 101 includes a central processing unit (CPU), also referred to as a processor 200. The processor 200 is interconnected with a non-transitory computer readable storage medium, such as a memory 204, having stored thereon various computer readable instructions for performing various actions (e.g. streaming media to the device 108). The memory 204 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 101 may optionally include one or more input devices, and one or more output devices, generally indicated as an optional input/output device 208. The input and output devices 208 serve to receive commands for controlling the operation of the device 101 and for presenting information, e.g. to a user of the device 101. The input and output devices 208 therefore include any suitable combination of devices, including a keyboard, a mouse, a display, a touchscreen, a speaker, a microphone, and the like). However, for example, in devices such as a wireless USB adapter, an access point, and the like, the input/output device 208 may not be present.

The device 101 further includes a wireless communications assembly 212 interconnected with the processor 200. The assembly 212 enables the device 101 to communicate with other communication devices, for example the device 102. In the present example, the assembly 212 enables such communication according to the IEEE 802.11ad standard (and/or the IEEE 802.11ay standard), and thus transmits and receives data at frequencies of around 60 GHz.

The communications assembly 212 includes a controller 216 in the form of one or more integrated circuits and/or logic circuits, configured to establish and maintain communications links with other devices. In some implementations, the processor 200 and the controller 216 may be combined.

The controller 216 is also configured to process outgoing data for transmission via an antenna array 220, which includes, but is not limited to, a phased array of antenna elements and/or antenna sectors, and to receive incoming transmissions from the array 220 and process the transmissions for communication to the processor 200. The controller 216, in the present example, may therefore include a baseband processor and a transceiver (also referred to as a radio processor), which may be implemented as distinct hardware elements or integrated on a single circuit, including, but not limited to, integrated circuits and/or logic circuits.

Example integrated circuits and/or logic circuits include one or more processors, one or more microprocessors, one or more ASIC (application-specific integrated circuits) and one or more FPGA (field-programmable gate arrays). In some implementations, the controller 216 is not a generic controller, but a controller specifically configured to implement beamforming training in basic service set discovery functionality. For example, in some implementations, the controller 216 specifically comprises a computer executable engine configured to implement specific beamforming training in basic service set discovery functionality.

Further, the controller 216 is configured to execute various computer-readable instructions (e.g. stored in a memory element integrated with the controller 216 or implemented as a discrete hardware component of the assembly 212 and connected with the controller 216) for performing the above functions. Further, the controller 216 is configured to execute a beamforming training in basic service set discovery application 224, also referred to herein as the application 224.

Via the execution of the application 224, the controller 216 is configured to operate the wireless communications assembly 212 to: transmit beacon data using the array 220, the beacon data comprising: beacon data parameters for operation of a basic service set: and beamforming data that includes receive beamforming training fields; and beamform with the second wireless communication device 102.

In particular, when the devices 101, 102 are generally operating according to the 802.11ad and/or 802.11ay protocols, the beacon data that includes beamforming data is transmitted in a Beacon Training Interval (BTI) of a beacon interval (BI) and the beamforming may occur in a Data Transmission interval (DTI) of the BI, for example when an Association Beamforming Training (A-BFT) interval of the BI fails (e.g. a response to the beacon data is not received in the A-BFT interval).

The array 220 generally comprises a phased antenna array which produces the beam 121. In general, as described above with respect to FIG. 1, the array 220 (and hence the device 101) may be operated in the following modes: an omni mode in which the beam 121 is transmitting (and/or receiving) up to an angle of 360° (and/or over directions and/or all directions over which the array 220 is configured to transmit and/or receive), either simultaneously or sequentially; and a directional mode in which the beam 121 is narrowed in one or more directions (to transmit and/or receive), for example towards the device 102. For example, in the omni mode all sectors of the array 220 may be simultaneously transmitting and/or receiving. However, in the omni mode, the controller 216 may control each of the sectors and/or groups of sectors, of the array 220 to transmit/receive sequentially; in such implementations, the controller 216 controls the array 220 to sequentially scan over all directions in which the array 220 is configured to transmit/receive. In other words, in the omni mode, the device 101 may transmit/receive using a sector sweep of the array 220. The controller 216 is generally configured to implement the application 224 to: narrow the beam 121 more precisely in the direction of the device 102; and/or to improve communications therebetween. Similarly, the controller of the device 102 is configured to: narrow the beam 122 more precisely in the direction of the device 101; and/or to improve communications therebetween.

Figure 3:
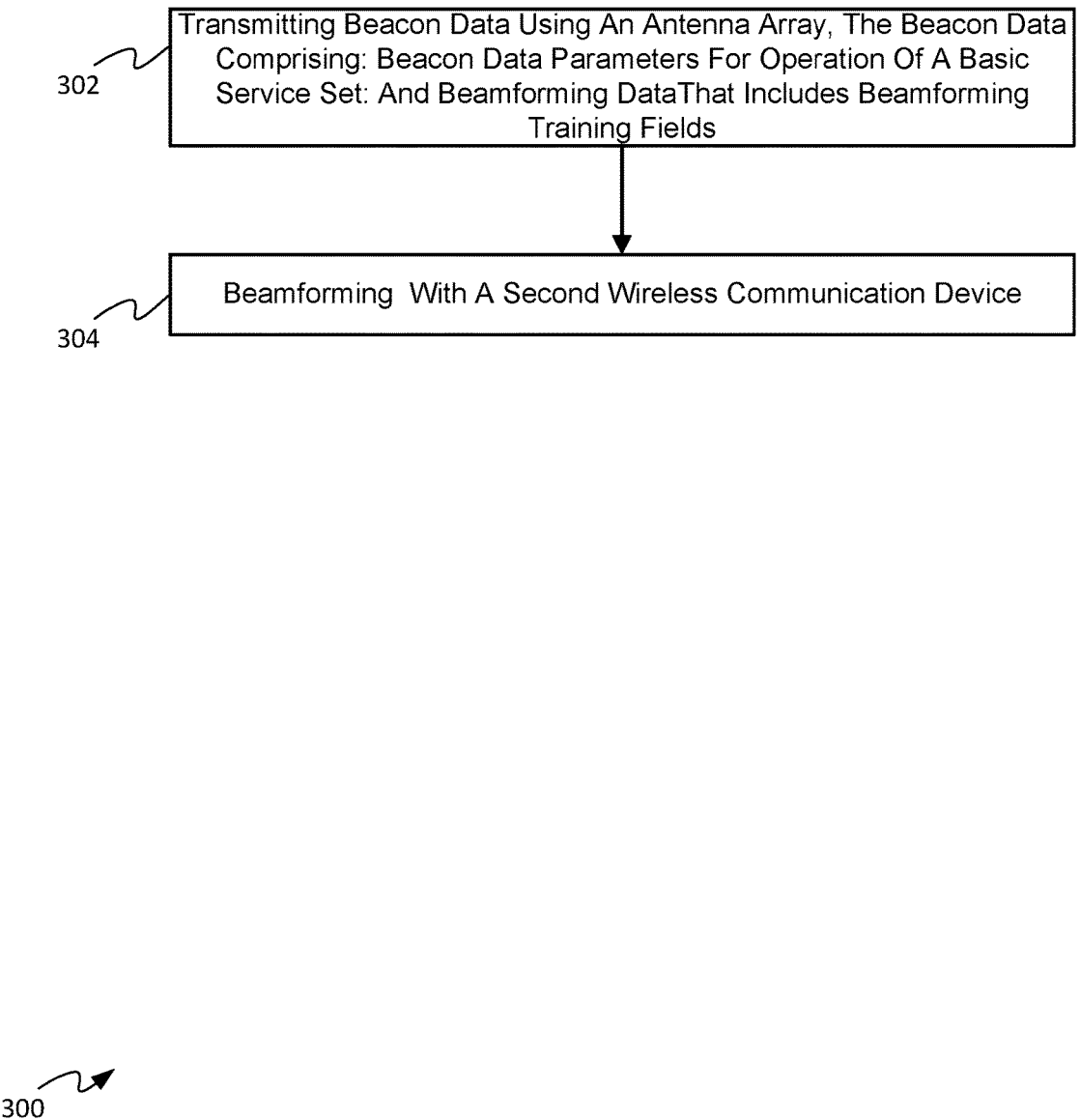
FIG. 3 depicts a flowchart of a method for beamforming training in basic service set discovery in the system of FIG. 1, according to non-limiting implementations.

Attention is now directed to FIG. 3, which depicts a flowchart of a method 300 for beamforming training in basic service set discovery, according to non-limiting implementations. In order to assist in the explanation of method 300, it will be assumed that method 300 is performed using system 100, and specifically by controller 216 of device 101, for example when controller 216 processes application 224. Indeed, method 300 is one way in which the system 100 and/or the device 101 and/or the controller 216 can be configured. Furthermore, the following discussion of the method 300 will lead to a further understanding of the device 101, and the system 100 and its various components. However, it is to be understood that the system 100 and/or the device 101 and/or the controller 216 and/or the method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise, various blocks may be performed in parallel rather than in sequence; hence the elements of method 300 are referred to herein as "blocks" rather than "steps". It is also to be understood, however, that method 300 can be implemented on variations of system 100 as well. Furthermore, while computing device 101 is described as implementing and/or performing each block of method 300, it is appreciated that each block of method 300 occurs using controller 216 processing application 224.

It is assumed in the method 300 that the device 101 has not yet exchanged service set credentials with the device 102 (such as respective service set identifiers, and the like), and that the beam 121 (e.g. the array 220 of the device 101) is being operated in an omni mode to broadcast a beacon, and similarly that the beam 122 (e.g. the respective array of the device 102) is also being operated in an omni mode to receive beacon data.

At block 302, the controller 216 transmits beacon data using the array 220, the beacon data comprising: beacon data parameters for operation of a basic service set: and beamforming data that includes receive beamforming training fields.

At a block 304, the controller 216 beamforms with the second wireless communication device 102.

In particular, the beamforming data includes receive beamforming training fields, as described hereafter, that enable the devices 101, 102 to operate their respective arrays 220 to more precisely direct beams 121, 122 towards each other.

Further, as the method 300 is being implemented, the devices 101, 102 may change between omni modes and directional modes depending, for example, on an interval of the BI and/or whether or not beamforming data and/or beamforming training fields are received from the other of the two devices 101, 102. For example, the device 101 may operate in the omni mode in the BTI and A-BFT intervals, in which the array 220 is transmitting and/or receiving sequentially in a sector sweep as described above, and also in a portion of the DTI interval, and in a directional mode in the DTI interval and/or in a portion of the DTI interval to perform beamforming training. Similarly, the device 102 may operate in an omni mode until the beacon data is received, and thereafter switch to a directional mode to perform beamforming training. Indeed, in the 802.11ad and/or the 802.11ay standards, switching between omni modes and directional modes at both access points and devices with which an access point is attempting to operate a service set is well known and such switching is included within the scope of the present specification.

For example, the device 101 may be broadcasting a service set identifier (SSID) in beacon data using the omni mode in a BTI at the block 302, and the device 102 may be receiving in the omni mode. When the beacon data is received at the device 102, the device 102 may switch to the directional mode based on a sector and/or sectors of the respective antenna array at which the beacon data is received and further perform beamforming training based on beamforming training fields in the beacon data (performing a sector sweep when receiving the receive beamforming training fields).

Furthermore, assuming that a respective antenna reciprocity setting is "1" and the like, each of the devices 101, 102 may be configured to assume that best antenna receive settings and best antenna transmit settings are interchangeable.

Similarly, the device 101 remains in the omni mode during the A-BFT, and may switch to a directional mode to scan for data being received from the device 102 (and/or other devices) in one or more directions during the DTI, and/or remain in an omni mode for a first portion of the DTI (e.g. to receive transmit beamforming training fields and provide feedback to the device 102), and switch to directional mode to perform a sector sweep when receiving RX-TRN fields from the device 102.

Method 300 will now be described with reference to FIG. 4 to FIG. 11.

Figure 4:
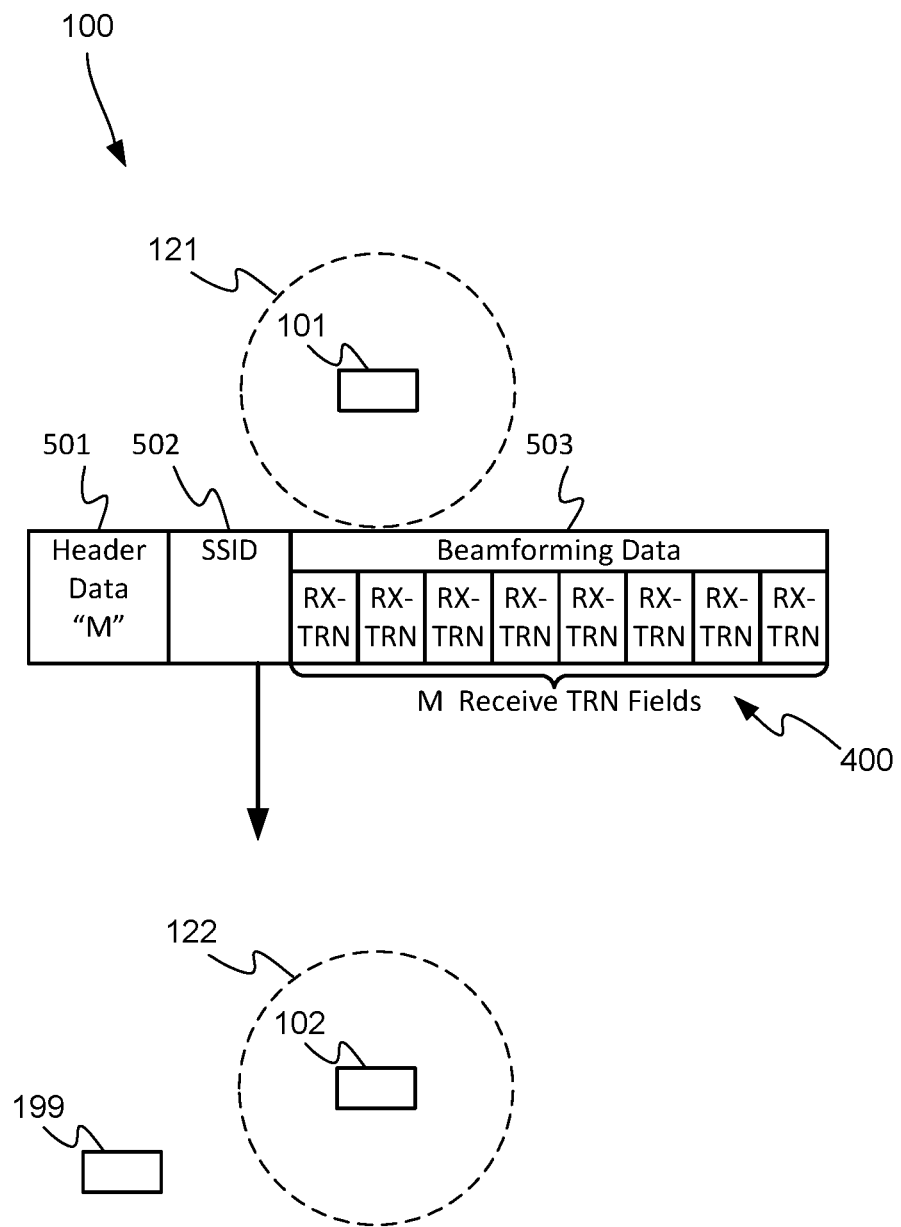
FIG. 4 depicts beacon data being transmitted from a device of the system of FIG. 1, according to non-limiting implementations.

Attention is next directed to FIG. 4, which depicts a non-limiting implementation of the block 302. FIG. 4 is substantially similar to FIG. 1, with like elements having like numbers. In FIG. 4, the device 101 is depicted transmitting and/or broadcasting beacon data 400 in the beam 122 in the omni mode, which is received at the device 102. The beacon data 400 may be in the form of a beacon frame that has a format similar to DMG beacon frames used in 802.11 protocols modified, however, to include beamforming data. Furthermore, while the beacon data 400 is depicted as being transmitted towards the device 102, it is understood that the beacon data 400 is being sequentially transmitted over all directions that the array 220 is configured to transmit in a sector sweep.

FIG. 4 also depicts a non-limiting implementation of the beacon data 400 generated by the device 101 when implementing the application 224.

The beacon data 400 includes: beacon data parameters which may include, but is not limited to: header data 501, a service set identifier (SSID) 502 (and/or another identifier of the device 101, such as a MAC (media access control) identifier); and beamforming data 503. The header data 501 defines a structure of the beamforming data 503, including, but not limited to, a number "M" of receive beamforming training (RX-TRN) fields in the beamforming data 503. While as depicted the beamforming data 503 is appended to the beacon data parameters (e.g. the SSID 502), the beamforming data 503 may be included anywhere in the beacon data 400, and indeed, the position of the beamforming data 503 may also be defined in the header data 501. Hence, while hereafter the beamforming data 503 is described as being appended to the remainder of the beacon data 400, the beamforming data 503 may be located anywhere in the beacon data 400.

The beacon data 400 may further include other headers and/or other beacon data parameters. For example, in some implementations, the beacon data 400 is defined by the 802.11ay standard where frames include an L-Header, an EDMG-Header-A1, and a EDMG-Header-A2. In these implementations, the header data 501 may be a portion of the EDMG-Header-A1. Similarly, the beacon data 400 may have any other type of format and/or include any other data and/or information that also includes the header data 501, and the beamforming data 503. Furthermore, while the SSID 502 is depicted as distinct from the header data 501, the SSID 502 may be component of the header data 501 and/or another header.

While not depicted, it is assumed that the beacon data 400 further includes an identifier of the sector and/or sectors of the array 220 used to transmit the beacon data 400 in a sector sweep; in other words, when the device 101 is in the omni mode, the device 101 sequentially transmits the beacon data 400 in a sector sweep and modifies the beacon data 400 with each transmission to include an identifier of the sector and/or sectors used to transmit the beacon data 400 in a given direction.

As depicted, the beamforming data 503 comprises a plurality of receive RX-TRN fields and in particular, a number "M" receive RX-TRN fields as defined in the header data 501. Furthermore, the receive RX-TRN fields, when received at the device 102, enable the device 102 to perform beamforming training at the respective antenna array. For example, the device 102 may receive the RX-TRN fields using perturbations of its respective antenna settings by changing, during receipt of RX-TRN fields, one or more of: a phase of the respective array 220 of the device 102, elements and/or sectors of the array 220 of the device 102 that are to be used to receive the RX-TRN fields, an antenna wave vector ("AWV"), a frequency that is to be used to receive the RX-TRN field, and the like. The device 102 may measure a quality parameter of each of the perturbations used to receive the RX-TRN fields which may be used to adjust the beam 122 to be more directional to the device 101, and/or improve communications with the device 102. The quality parameter measured may included, but is not limited to, one or more of an RSSI (Received Signal Strength Indicator), error indicators, and the like. Further, one or more quality parameters may be measured.

Each of the TRN fields, as described herein, comprise one or more complementary sequences, including, but not limited to, Golay sequences and the like. Furthermore, while not depicted each of the TRN fields may include a respective identifier.

Furthermore, as will be described hereafter, receive RX-TRN fields may be included in one or more of sector sweep (SSW) frames, probe request frames, probe response frames, association (and/or re-association) frames, that are otherwise used in the 801.11ad standard and/or the 802.11ay standard to operate a service set.

Various implementations of method 300 are next described with reference to FIG. 5 to FIG. 11, each of which depict data and/or frames transmitted by devices 101, 102 (and device 199) as a function of time in a beacon interval, which includes a BTI interval, an A-BFT interval and a DTI interval. It is assumed in the FIG. 5 to FIG. 11 that any data and/or frame transmitted by the devices 101, 102 is received at the other of the devices 101, 102. Hence, while the method 300 may be used in protocols and standards different from either of the 801.11ad standard and the 802.11ay standard, examples of the method 300 shown in each of FIG. 5 to FIG. 11 are specifically described with respect to the 801.11ad standard and/or the 802.11ay standard. Hence, the device 101 which is transmitting the beacon data 400 may alternatively be referred to as a "PCP/AP" (personal basic service set (PBSS) control point/access point), and the devices 102, 199 may be referred to as stations.

Indeed, in each of the 801.11ad standard and the 802.11ay an access point may transmit beacon data according to one of at least two settings of a discovery mode, which is a type of a DMG beacon that belongs to a non-formed BSS and act mostly as a SSW frame rather than a regular DMG beacon of a formed BSS. The discovery mode may be defined according to a parameter DM stored in DM field at a device (e.g. the devices 101, 102, 199) which may have a value of "0" or "1". For DM=0 beacon data is being transmitted in the BTI regularly (e.g. according to a given frequency) and either of a receiving device, such as the device 102, and the access point may transmit a probe request. Furthermore, in an existing BSS, the Point coordinator (AP/PCP) (e.g. the device 101) may be transmitting DMG beacons with discover mode field set to 0 (operational BSS); after a device (e.g. the device 102) beamforms with such an AP and/or PCP the device will transmit a probe request to the PCP/AP to get a probe response that includes information about the existing BSS.

For DM=1 beacons are used in what is called a discover procedure such that two devices can find each other and form a PBSS therebetween. In discovery mode 1, a device (e.g. the device 101) that transmits a DMG Beacon (which may also be referred to as a Discover mode 1 beacon) also transmits a Probe request to a second device (e.g. the device 102) that attempts to beamform with the beaconing device in the A-BFT interval.

Figure 5:
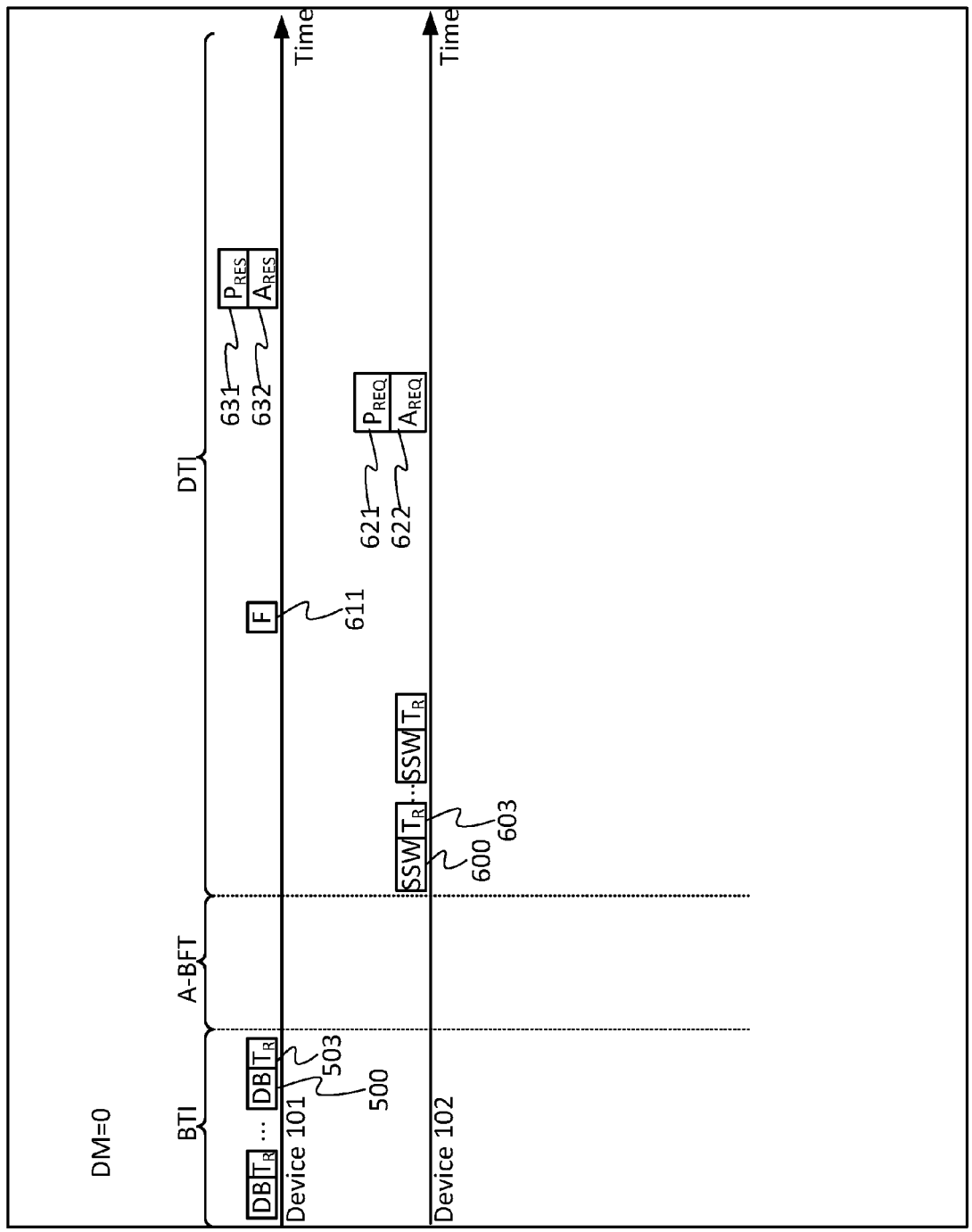
FIG. 5 depicts data and/or frames transmitted between the devices of the system of FIG. 1 as a function of time in a beacon interval, assuming DM=0, according to non-limiting implementations, according to non-limiting implementations.

Attention is first directed to FIG. 5 in which it is assumed that DM=0, and the device 101 is transmitting (e.g. at the block 302), in the BTI, the beacon data 400 (labelled "DM" for "Discovery Mode") with RX-TRN fields appended thereto (labelled TR) as beamforming data 503. FIG. 5 further shows that the device 101 may transmit more than one set of beacon data 400 in the BTI, for example using different sectors of the array 220, and that each set of beacon data 400 includes an identifier of a sector and/or sectors of the array 220 used to transmit the respective set of beacon data 400. In other words, the beacon data 400 is transmitted in a sector sweep of the array 220.

It is assumed that the device 102 receives the beacon data 400 with the beamforming data 503. The device 102 generally measure a quality parameter of each of the sets of beacon data 400 including, but is limited to, one or more of an RSSI (Received Signal Strength Indicator), error indicators, and the like. Further, one or more quality parameters may be measured; as each set of beacon data 400 includes an identifier of a sector and/or sectors used to transmit the beacon data 400, the device 102 may further determine a "best" transmit sector of the device 101 (e.g. sector(s) of the array 220 used to transmit a set of beacon data 400 having the best quality parameter, for example, the largest RSSI and/or the smallest error rate). However, the device 102 further uses the RX-TRN fields of the beamforming data 503 to perform beamforming training in a sector sweep as described above, based, for example, on the number "M" in the header data 501.

In other words, the RX-TRN fields of the beamforming data 503 may assist the device 102 in determining a general direction of the device 101 with respect to sectors of a respective array 220 of the device 102 (e.g. the device 102 determines which subset of sectors of its respective array 220 were used to receive RX-TRN fields). The device 102 will further received the SSID 502 and the like in the beacon data 400.

As depicted, during the A-BFT interval, either no response is received from the device 102 and/or beamforming failed as only sector sweeps frames with errors and/or noise was received from the device 102. For example, the device 102 may not have time to generate a response that can be received at the device 101 in the A-BFT interval.

However, during the DTI, the device 102 transmits, one or more sector sweep (SSW) frames 600 with RX-TRN fields 603 appended thereto, for example one SSW frame 600 for each sector over which a sector sweep is occurring. While not explicitly depicted in FIG. 5, each of the SSW frames 600 include an SSW feedback field (SSWF) which includes an identifier of the sector of the array 220 of the device 101 which transmitted the set of beacon data 400 having the best quality parameter. Hence, the SSW frames 600 inform the device 101 of a best transmit sector of the array 220 that is to be used to form the beam 121 in the directional mode.

While not explicitly depicted, it is appreciated that each SSW frame 600 further includes a respective identifier of a sector (and/or sectors) of the array of the device 102 used to transmit a respective SSW frame 600. When the device 101 receives an SSW frame 600 with an identified sector of the array of the device 102, the device 101 may provide feedback (e.g. feedback frame 611, as described below) to the device 102 to assist the device 102 in refining its beam 122. Indeed, in some implementations, such SSW frames may be transmitted in the A-BFT interval, but without the RX-TRN fields 603; however, as depicted in FIG. 5, it is assumed that any transmission of SSW frames in the A-BFT interval have failed to result in beamforming.

Hence, beamforming has been extended in the DTI without, however, the slotting and time constraints of an A-BFT interval, which allows the device 102 to add the RX-TRN fields 603 to the SSW frames 600 to enable the device 101 to also perform beamforming training. Furthermore, without the slotting and time constraints of an A-BFT interval, the device 102 may transmit more SSW frames 600 than transmitted in the A-BFT interval.

Hence, in the BTI, the RX-TRN fields of the beamforming data 503 are used by the device 102 to determine an initial phase and/or set of sectors of a respective array 220 of the device 102 having the best quality parameter(s). Then, in the DTI, the one or more SSW frames 600 are used to perform a further sector sweep around the initial phase and/or set of sectors of the device 102. Also in the DTI, the RX-TRN fields 603 included in the SSW frames 600 are used by the device 101 to perform its own beamforming training. Hence, the SSW frames 600 are adapted to provide beamforming for both of the devices 101, 102.

While not depicted, it is assumed that header data of the SSW frames 600 have been modified to specify a number and/or structure of the receive RX-TRN fields 603. The header data may be used by the device 101 to determine when to operate in to a directional mode to perform a sector sweep using the receive RX-TRN fields 603 and determine one or more quality parameters for each to refine a direction (e.g. narrow a direction), and the like of the beam 121 towards the device 102; otherwise, the device 101 may operate in an omni mode to receive the portions of the SSW frames 600 that don't include the receive RX-TRN fields 603.

Figure 12:
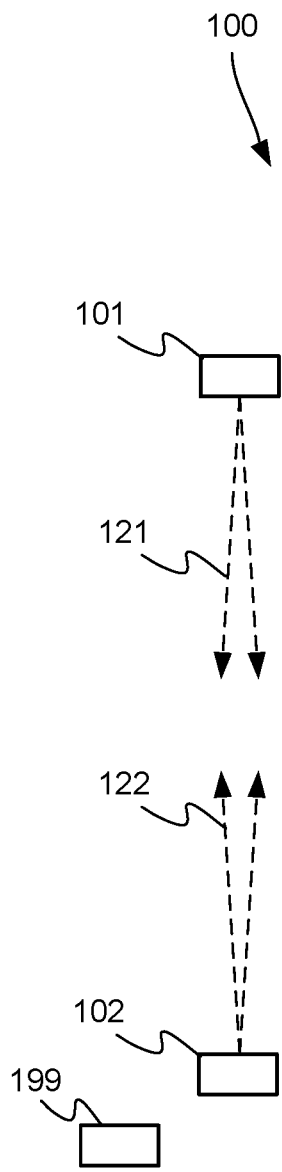
FIG. 12 depicts two of the devices of the system of FIG. 1 adjusting communications therebetween, according to non-limiting implementations.

Hence, in addition to performing its own beamforming training using the RX-TRN fields 603, the device 101 also assists the device 102 with beamforming training by measuring one or more quality parameters for the SSW frames 600 and transmits a feedback frame 611 (labelled F) to the device 102 in the DTI using the best transmit sector received in the SSW frames 600. In response to receiving the feedback frame 611, the device 102 may narrow the beam 122 more directionally towards the device 101 (e.g. as depicted in FIG. 12). The feedback frame 611 may be transmitted in a directional mode based on the measurement of the quality parameters of the RX-TRN fields 603, or in an omni mode. Furthermore, the device 101 uses the SSWF in the SSW frames 600 to narrow the beam 121 more directionally towards the device 102 (e.g. as also depicted in FIG. 12). Indeed, in these implementations, and/or any implementations where data is not expected to be received in the A-BFT, the A-BFT may be eliminated, and/or the device 101 may enter the DTI immediately following the BTI. Furthermore, in these implementations neither of the devices 101, 102 need to wait for a next BI and/or BTI to beamform in the A-BFT just to be able to transmit (for example) association frames and/or probe frames. In particular, as beamforming is extended in the present specification to the DTI, this may enable the devices 101, 102 to transmit management frames (e.g. association frames and/or probe frames) and finish scanning and/or association in the same BI where the beacon data was received, rather than continue scanning and/or association in another BI.

Hence. using the refined beam 122, the device 102 may transmit a probe request frame 621 and/or an association request frame 622 to the device 101 to form an association and/or operate service set therebetween using the best set of antenna settings determined from the feedback frame 611. Using the refined beam 121, the device 101 receives and responds to the probe request frame 621 and/or the association request frame 622 (e.g. also at the block 304 of the method 300) responds by transmitting one or more of a probe response frame 631 and/or an association response frame 632 to the device 102 in the DTI interval, thereby forming a service set with the device 102. The probe response frame 631 and/or the association response frame 632 may be transmitted in a directional mode or an omni mode.

As depicted, the device 102 transmits the SSW frames 600 at a beginning of the DTI, and indeed, the beacon data 500 may further include information that defines the timing of the DTI such that the device 102 may determine when the DTI begins and ends. Hence, the device 102 may be configured to transmits the SSW frames 600 at a beginning of the DTI based on the beacon data 500, such that the frames 611, 621, 622, 631, 632 may be transmitted and received in the DTI. In some implementations, however, the any of the frames 611, 621, 622, 631, 632 may be transmitted in a next DTI (e.g. in a next beacon interval) when it is not possible to receive/transmit the frames 611, 621, 622, 631, 632 in a current DTI.

Figure 6:
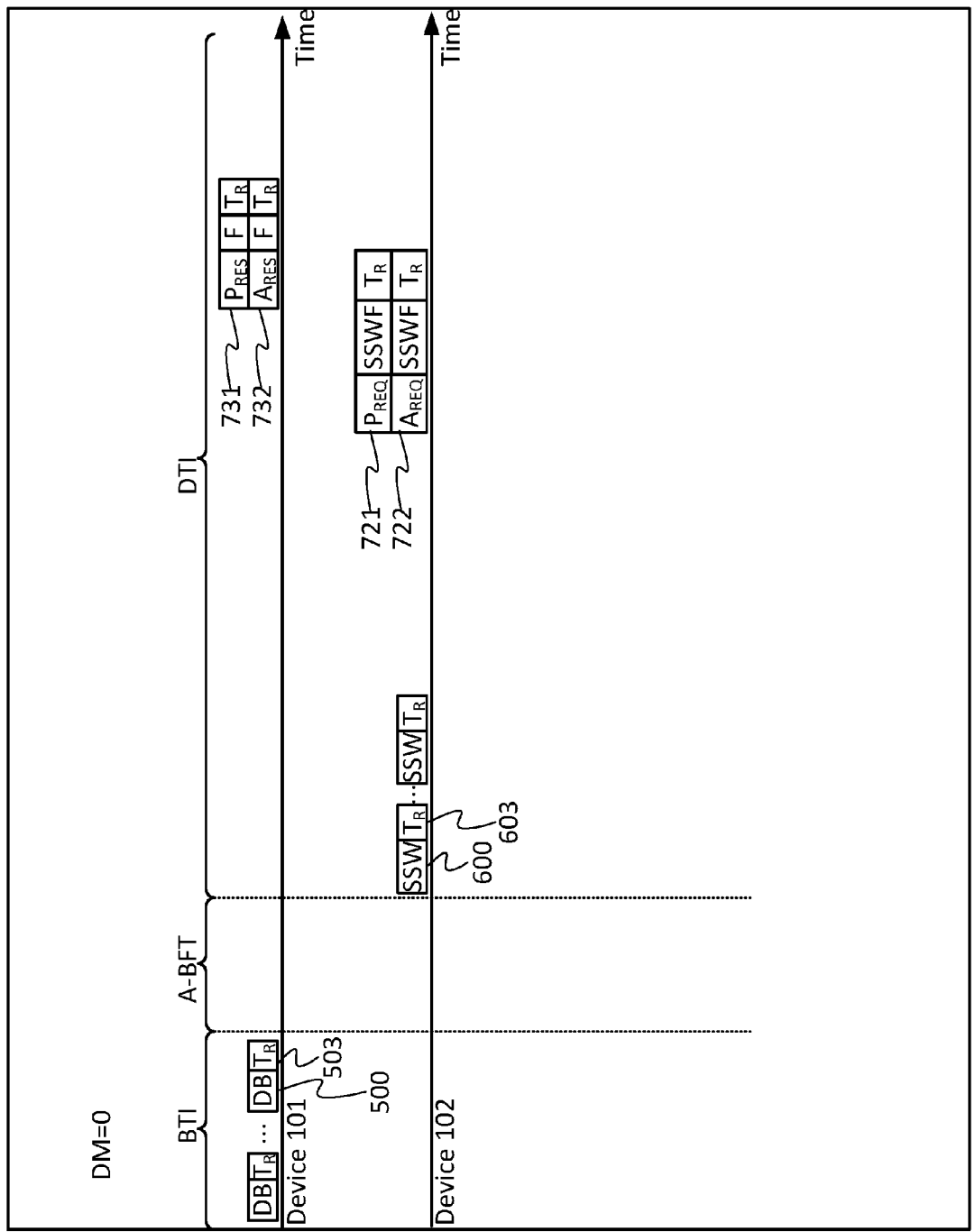
FIG. 6 depicts data and/or frames transmitted between the devices of the system of FIG. 1 as a function of time in a beacon interval, assuming DM=0, and when a feedback process fails, according to non-limiting implementations.

Attention is next directed to FIG. 6, which is substantially similar to FIG. 5, with like elements having like numbers.

However, in FIG. 6, the feedback process has failed and the device 101 has either not successfully received the SSW frames 600 (e.g. the device 101 was not performing a sector sweep in the direction of the device 102 when the SSW frames 600 were transmitted, one or more errors occurred, and the like), and/or the device 101 was not able to measure a quality parameter.

However, the devices 101, 102 still attempt to operate as a service set, and the device 101 transmits one or more of a probe request frame 721 and/or an association request frame 722 to the device 101 to form an association and/or operate a service set therebetween; assuming the device 101 receives the probe request frame 721 and/or the association request frame 722 (e.g. also at the block 304 of the method 300), the device 101 responds by transmitting one or more of a probe response frame 731 and/or an association response frame 732 to the device 102 in the DTI interval, thereby forming and/or operating a service set with the device 102.

However, in contrast to the implementation of FIG. 5, each of the frames 721, 722, 731, 732 have receive RX-TRN fields appended thereto (and headers of the frames 721, 722, 731, 732 are modified to include data indicating a structure thereof, for example, a respective number "M" of the RX-TRN fields appended thereto). The frames 721, 722 are transmitted using the same antenna settings of the device 102 that had the best quality parameter(s) when receiving the beamforming data 503 of the beacon data 500, or the frames 721, 722 are alternatively transmitted in an omni mode. Whether the device 102 transmits the frames 721, 722 using a directional mode or omni mode may depend on whether an antenna reciprocity setting at the device 102 is "1" or "0"; if "1", the device 102 assumes that the law of reciprocity is applicable, and the best "receive" sectors are the same as best "transmit" sectors and the directional mode is used using the receive sectors that had the best quality parameters; otherwise if "0", the omni mode is used.

Furthermore, as depicted, the frames 721, 722, may be further modified to include an SSW feedback field (labelled SSWF) which includes feedback on the best transmit antenna sector of the device 101 as determined when the beacon data 400 was received, and the frames 731, 732 maybe further modified to include feedback (F) for the receive RX-TRN fields of the frames 721, 722 thereto. Furthermore, the frames 731, 732 are transmitted with antenna settings selected according to the SSW feedback field SSWF indicated in the frames 721, 722. While not depicted, the device 102, after receiving the frames 731, 732 with the RX-TRN fields appended thereto, may transmit further feedback to the device 101 to assist the device 101 with further refinement of the beam 121.

Figure 7:
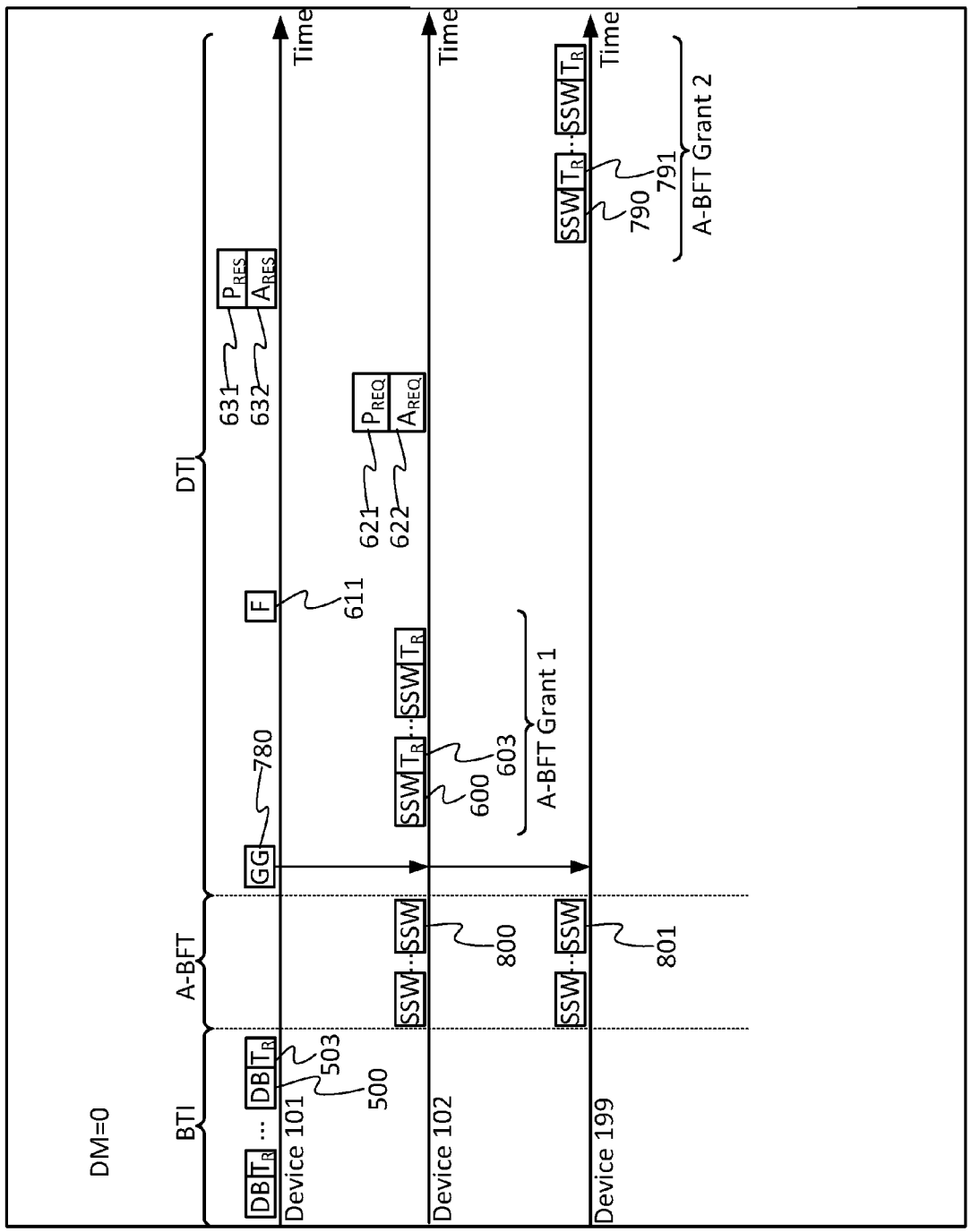
FIG. 7 depicts data and/or frames transmitted between the devices of the system of FIG. 1 as a function of time in a beacon interval, assuming DM=0, and showing A-BFT grant slots being dynamically allocated in a data transmission interval using a group grant, according to non-limiting implementations.

Attention is next directed to FIG. 7, which is substantially similar to FIG. 5, with like elements having like numbers. However, in FIG. 7, it is assumed that the beacon data 500 was received at both the device 102 and the device 199, and that each of the devices 102, 199 respond to the beacon data 500 by transmitting one or more respective SSW frames 800, 801 in the A-BFT interval of the device 101; however, a collision occurred and the SSW frames 800, 801 as their receipt resulted in an error at the device 101. Either way, beamforming failed in the A-BFT interval due to a collision but receipt of some data (e.g. energy) was detected at the device 101 in the A-BFT interval.

Based on the beamforming data 503 in the beacon data 500, each of the devices 102, 199 have already performed initial beamforming training with the device 101 using the beamforming data 503, and have further determined a respective best transmit sector of the device 101. Hence, each of the devices 102, 199 may direct their respective beams (e.g. such as the beam 122 of the device 102) towards the device 101, and further inform the device 101 of a best respective transmit sector.

In contrast to systems in which the A-BFT interval is extended to address collisions, the device 101 performs an group A-BFT grant process with the devices 101, 199 in the DTI. For example, as depicted in FIG. 7, the device 101 transmits A-BFT global grant frames 780 (labelled GG) to the device 102, for example in an omni mode using a sector sweep (e, the A-BFT global grant frames 780 including an identifier of a respective transmit sector). Furthermore, the device 101 configures the DTI into a given number of ABFT grant slots, the given number being configurable at the device 101. The A-BFT global grant frames 780 further identify available ABFT grant slots in the DTI that may be used by the devices 102, 199 to perform beamforming training.

As depicted, each of the devices 102, 199 receive one or more of the A-BFT global grant frames 780, and each of the devices 102 199 may randomly select and available slot in the DTI to perform beamforming training. As depicted, the device 102 has selected a first ABFT grant slot and responds to receipt of a A-BFT global grant frames 780 by transmitting the SSW frames 600 in the first ABFT grant slot (ABFT Grant 1). While optional in this implementation, the SSW frames may be transmitted with the receive—RX-TRN 603 appended thereto as described above; otherwise the SSW frames are transmitted without the receive RX-TRN 603. The device 101 responds with the feedback frame 611, and the devices 101, 102 again exchange frames 621, 622, 631, 632 as described above.

As depicted, the device 199 has selected a second ABFT grant slot and then performs a similar process by transmitting respective SSW frames 790 that include respective receive RX-TRN fields in the second ABFT grant slot (ABFT Grant 2). While not depicted, the devices 101, 199 further exchange a feedback frame and respective frames similar to frames 621, 622, 631, 632 as described above.

Hence, as depicted the given number of ABFT grant slots in the DTI is "2", though the more ABFT grant slots may be provided in the DTI. If a number of devices that are attempting to beamform with the device 101 is greater than the given number of ABFT grant slots, devices that did not beamform with the device 101 wait until the next BI to attempt to do so.

Similarly, when each of the devices 102, 199 randomly select the same ABFT grant slot in the DTI, a collision will again occur, and neither will receive feedback. Hence, when respective SSW frames are transmitted by the devices 102, 199 in a selected slot, and no feedback frame is received (e.g. due to a collision) within a given time period, each device 102, 199 again randomly selects another of the available ABFT grant slots as indicated in the A-BFT global grant frames 780.

Furthermore, the device 101 may continue to wait for SSW frames in ABFT grant slots (e.g. from the devices 102, 199 and/or any other devices) until no energy and/or SSW frames are received in ABFT grant slots. Alternatively, the device 101 may grant only one ABFT slot per DTI.

Figure 8:
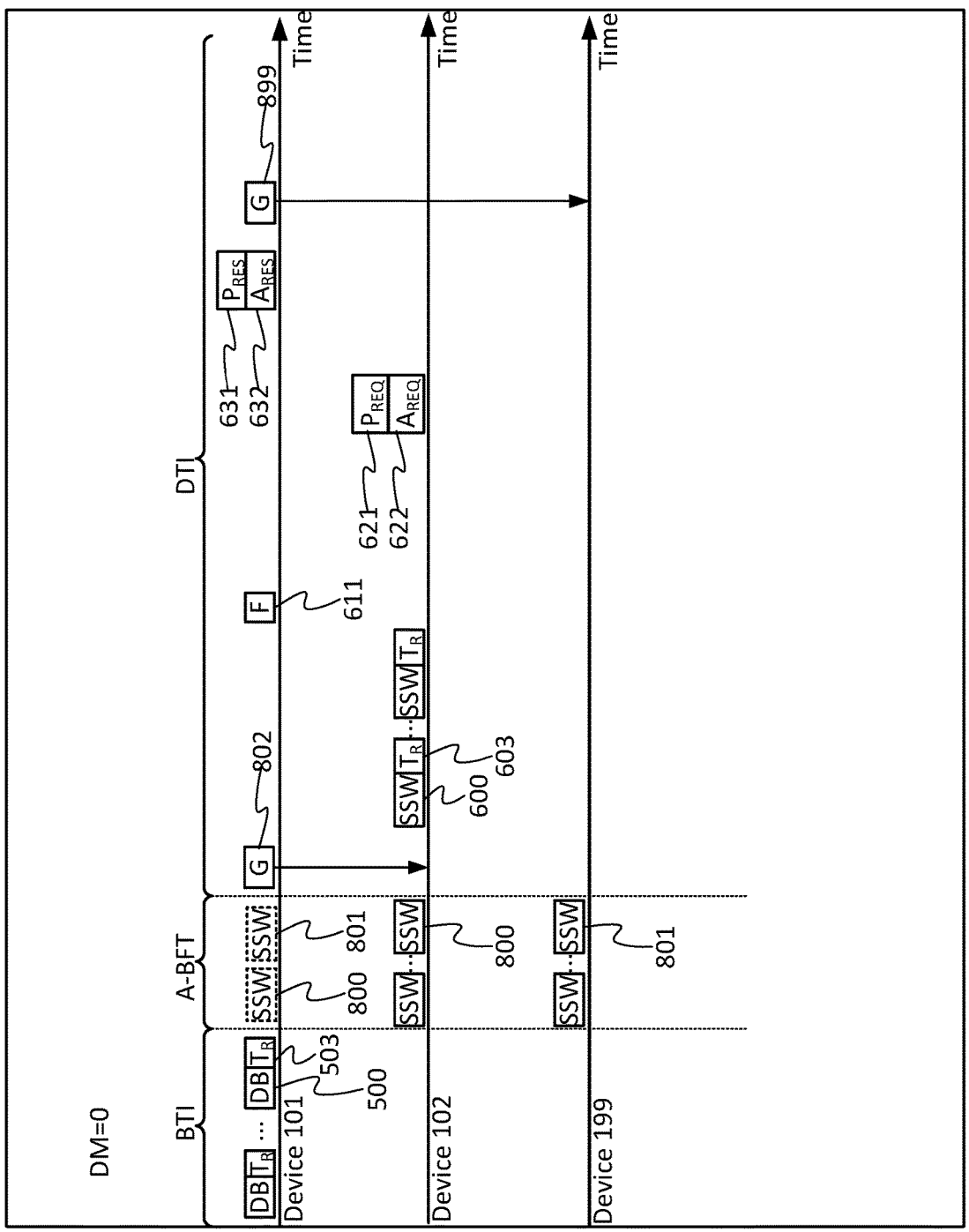
FIG. 8 depicts data and/or frames transmitted between the devices of the system of FIG. 1 as a function of time in a beacon interval, assuming DM=0, and showing A-BFT grant slots being dynamically allocated in a data transmission interval based on sector sweep data received in an Association Beamforming Training interval, according to non-limiting implementations.

Attention is next directed to FIG. 8, which is substantially similar to FIG. 5, with like elements having like numbers. However, in FIG. 8, it is assumed that the beacon data 500 was received at both the device 102 and the device 199, and that each of the devices 101, 199 respond to the beacon data 500 by transmitting one or more respective SSW frames 800, 801 in the A-BFT interval of the device 101, such that the device 101 receives SSW frames 800, 801 in the A-BFT interval. The SSW frames 800, 801 received at the device 101 are depicted in broken lines to distinguish (e.g. other data transmitted by the device 101 is depicted in solid lines).

In other words, beamforming failed in the A-BFT interval due to a collision however the SSW frames 800, 801 were received at the device 101 (e.g. in contrast to the implementation in FIG. 7). Furthermore, as the SSW frames 800, 801 generally include a respective identifier (e.g. a MAC address, and the like) of the respective device 102, 199 that transmitted an SSW 800, 801 frame, the device 101 may determine the identifiers of the devices 102, 199 that are attempting to beamform and/or operate a service set with the device 101.

Furthermore, based on the beamforming data 503 in the beacon data 500, each of the devices 102, 199 have already performed initial beamforming training with the device 101, and have further determined a respective best transmit sector of the device 101. Hence, each of the devices 101, 199 may direct their respective beams (e.g. such as the beam 122 of the device 102) towards the device 101, and further inform the device 101 of a best respective transmit sector.

In contrast to systems in which the A-BFT interval is extended to address collisions, and in contrast to the global A-BFT grant process shown in FIG. 7, the device 101 performs a sequential A-BFT grant process with each of the devices 101, 199 in the DTI. For example, as depicted in FIG. 8, the device 101 first transmits an A-BFT grant frame 802 (labelled G) to the device 102, for example in a directional mode using a best respective transmit sector received if the SSW frame 800, or in an omni mode when the respective transmit sector was not received in the SSW frame 800 (e.g. due to errors and the like). The A-BFT grant frame 802 includes an identifier of the device 102. The device 102 responds by transmitting the SSW frames 600 as described above. While optional in this implementation, the SSW frames may be transmitted with the receive—RX-TRN 603 appended thereto as described above; otherwise the SSW frames are transmitted without the receive RX-TRN 603. The device 101 responds with the feedback frame 611, using the best transmit sector received in the SSW frames 600 and/or the frame 800, and the devices 101, 102 again exchange frames 621, 622, 631, 632 as described above.

The device 101 then repeats the A-BFT grant process with the device 199 by transmitting another A-BFT grant frame 899 to the device 199 (e.g. the A-BFT grant frame 899 being similar to the A-BFT grant frame 802, but with an identifier of the device 199 and transmitted using the best respective transmit sector as determined by the device 199, assuming the best respective transmit sector is received with the SSW frame 801); while not depicted, SSW frames, feedback frames and probe/association frames are all then exchanged between the devices 101, 199 similar to that described above.

Hence, put another way, ABFT slots are included in the DTI, one for each device 102, 199 for which a collision occurred in the A-BFT interval, and for which a respective identifier was determined. But as the A-BFT grant frames 802, 899 are transmitted sequentially, no contention occurs.

Furthermore, any devices that do not receive an A-BFT grant frame (e.g. devices that received the beacon data 500 but did not respond in the A-BFT interval), may perform beamforming with the device 101 in the remainder of the DTI as described above with.

Implementations in which DM=1 will now be described. Indeed, in general, such implementations are similar to those in which DM=0, however devices (such as the device 101) that SSW feedback frames may also transmit probe requests with or without RX-TRN fields. In implementations where feedback fields for the receive RX-TRN fields are not transmitted by the device 101 due to a failure, a device (such as the device 102), may transmit a discovery response frame to the device (e.g. the device 101) which transmits the beacon data, with an SSW-feedback field reporting the best transmit antenna sector as described above. The discovery response frame may also include RX-TRN fields. The device which receives the discovery response frame will send a probe request frame with/without receive RX-TRN fields using the transmit antenna sector received SSW-feedback field of the discovery response frame. The other device will respond with a probe response.

Figure 9:
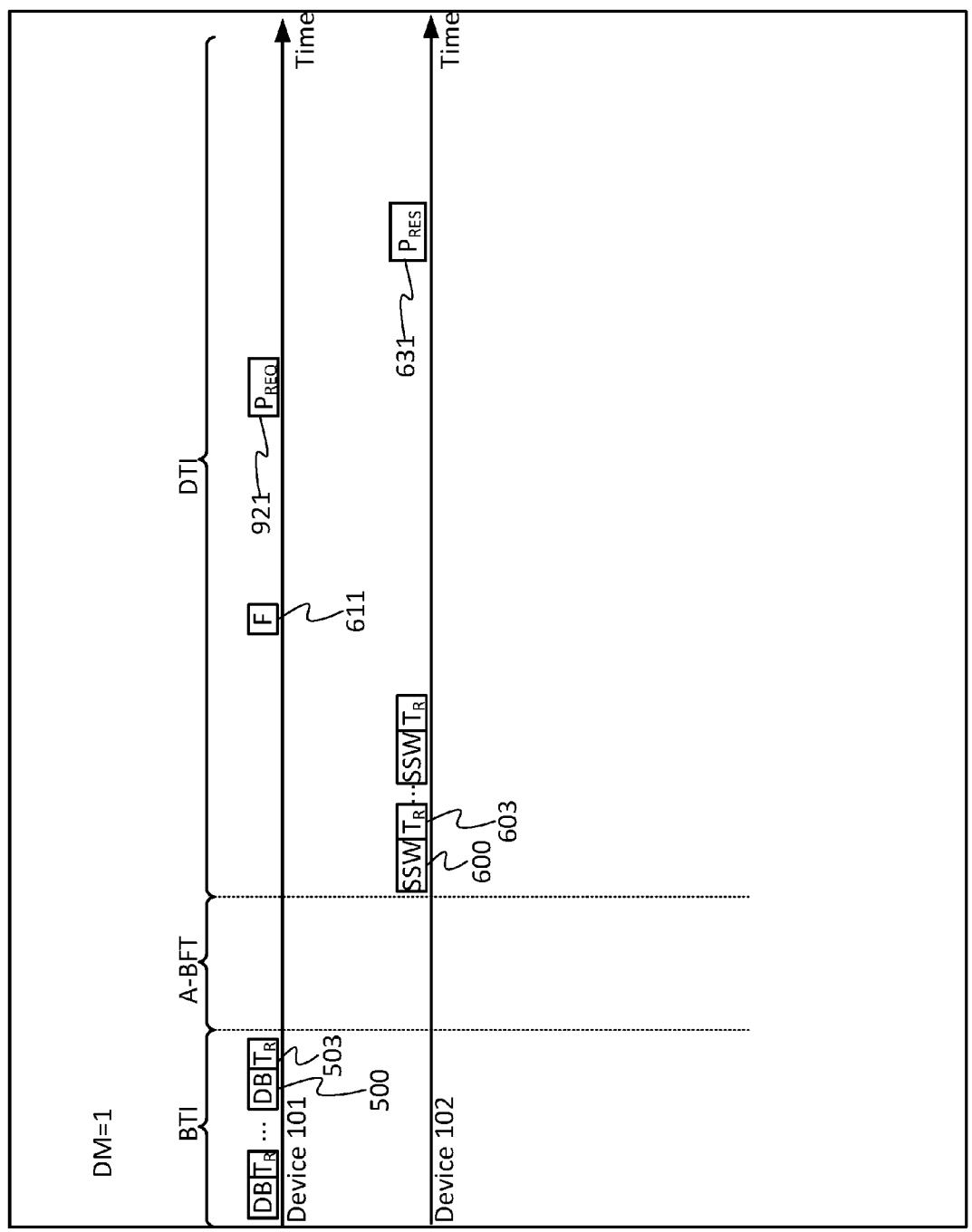
FIG. 9 depicts data and/or frames transmitted between the devices of the system of FIG. 1 as a function of time in a beacon interval, assuming DM=1, according to non-limiting implementations.

Attention is next directed to FIG. 9, which is substantially similar to FIG. 5, but with DM=1. The devices 101, 102 proceed as in FIG. 5 up to the device 101 transmitting the feedback frame 611. However, thereafter, the device 101 transmits a probe request frame 921 (similar to the probe request frame 621 transmitted by the device 102), and the device 102 responds with a probe response frame 931 (similar to the probe response frame 631 transmitted by the device 101). As DM=1, no association frames are exchanged.

Figure 10:
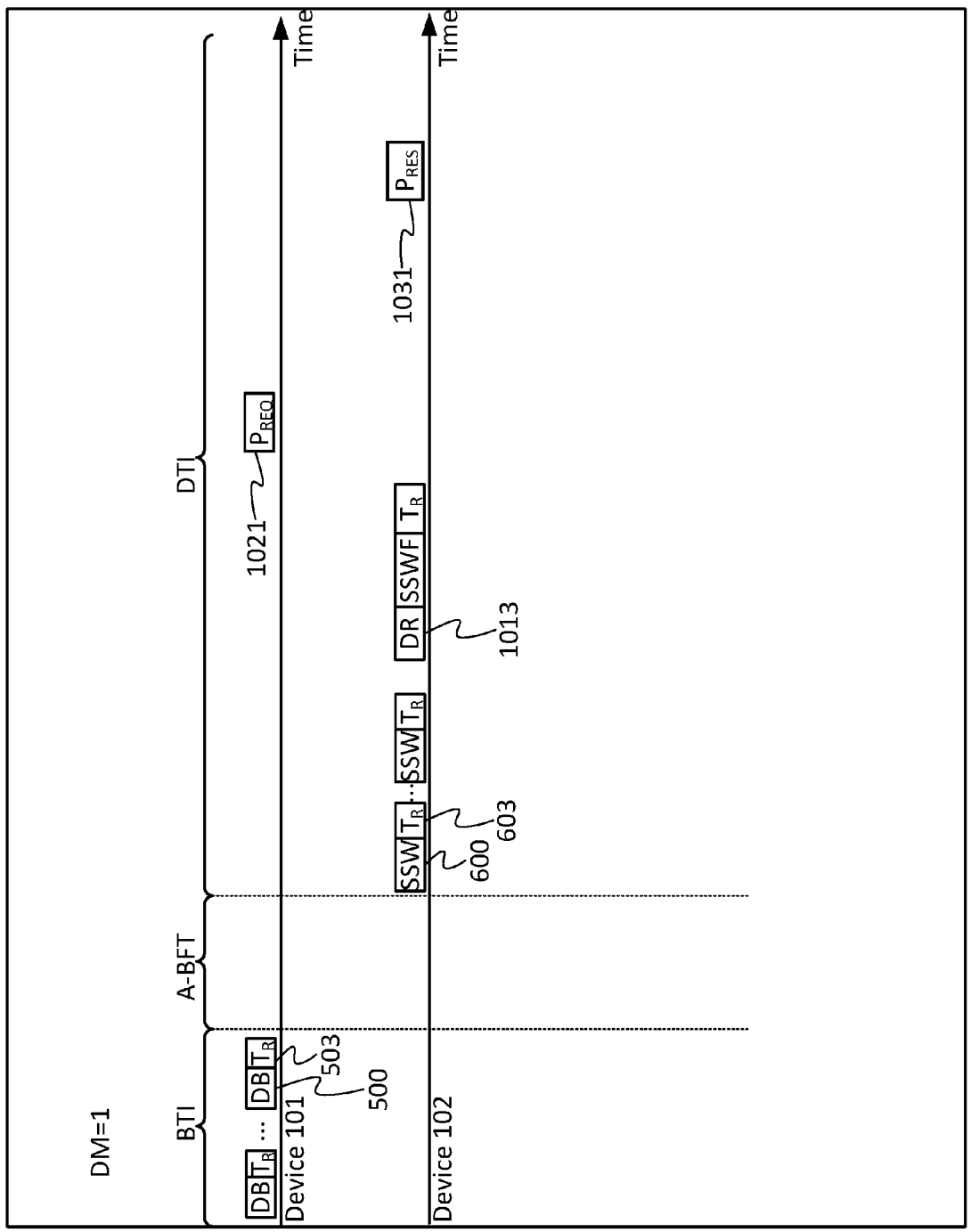
FIG. 10 depicts data and/or frames transmitted between the devices of the system of FIG. 1 as a function of time in a beacon interval, assuming DM=1, and when a feedback process fails, according to non-limiting implementations.

Attention is next directed to FIG. 10, which is substantially similar to FIG. 6, but with DM=1. The devices 101, 102 proceed as in FIG. 6 up to the device 102 transmitting the SSW frames 600 with the receive RX-TRN fields 603 appended thereto, and, as in FIG. 6, the feedback process has failed. Hence, thereafter, the device 102 transmits a discovery response frame 1013 (labelled DR) to the device 101 using the best set of antenna settings determined from receipt of the beamforming data 503. While not depicted, the discovery response frame 1013 is also transmitted with the SSW feedback field (SSWF) reporting the best transmit antenna sector of the device 101. Furthermore, the discovery response frame 1013 has receive RX-TRN fields appended thereto. In response to receiving the discovery response frame 1013, the device 101 performs beamforming training with the RX-TRN fields around the transmit sector received in the SSW feedback field SSWF of the discovery response frame 1013, and transmits a probe request frame 1021 to the device 102 using antenna settings determined in the beamforming training. The device 102 response with a probe response frame 1031. As DM=1, no association frames are exchanged.

Figure 11:
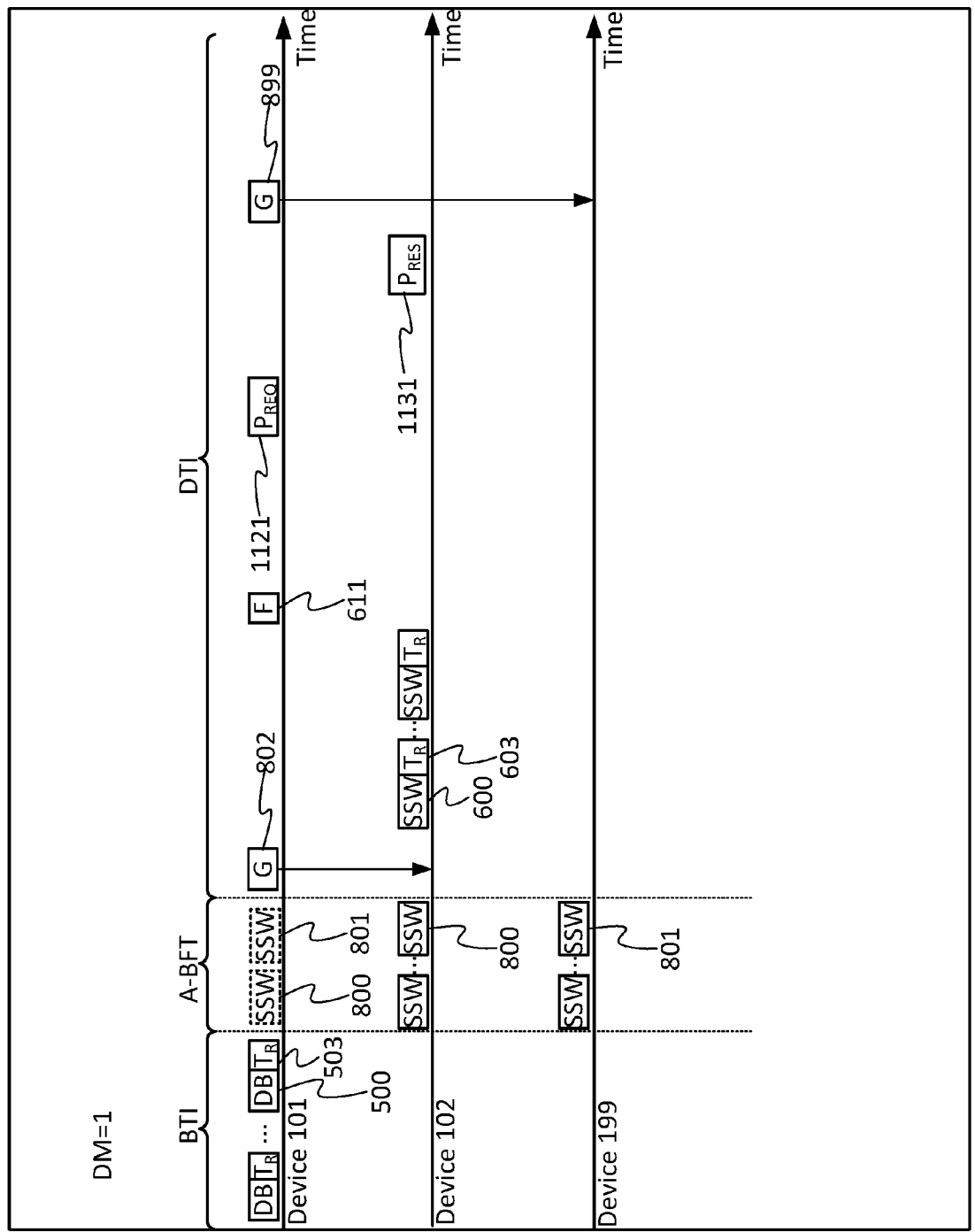
FIG. 11 depicts data and/or frames transmitted between the devices of the system of FIG. 1 as a function of time in a beacon interval, assuming DM=1, and showing A-BFT grant slots being dynamically allocated in a data transmission interval based on sector sweep data received in an Association Beamforming Training interval, according to non-limiting implementations.

Attention is next directed to FIG. 11, which is substantially similar to FIG. 8, with like elements having like numbers, except DM=1. Indeed, the process in FIG. 11 is similar to the process of FIG. 8, and when collisions occur in the A-BFT interval, A-BFT grant slots are included in the DTI. However, in contrast to FIG. 8, as DM=1, the device 101 transmits a probe request frame 1121, and the device 102 responds with a probe response frame 1131. As DM=1, no association frames are exchanged.

In any event, using any of the techniques described herein, as depicted in FIG. 12, the devices 101, 102 may adjust their respective beams 121, 122 to be more directional towards each other and/or to improve communications therebetween. Such adjustment may include changing the antenna settings, as described above, used to generate the beams 121, 122. While not depicted, respective beams between the devices 101, 199 may also be adjusted.

Provided herein are devices in which beamforming data is added to a beacon, and furthermore, A-BFT functionality is extended and/or moved to the DTI interval. For example, A-BFT slots may be dynamically allocated in the DTI instead of waiting for a next beacon interval. A-BFT Grant frames may be transmitted to specific stations (e.g. the devices 101, 199), as a PCP/AP (e.g. the device 101) will determine which stations responded to a beacon during an A-BFT collision. Hence, functionality of an A-BFT interval may extended to a DTI. Furthermore, receive RX-TRN fields may be included in DMG beacons, probes, and association frames to that allows a receiver station to train its receive sectors in a respective antenna array and, assuming an Antenna Reciprocity setting is 1 (and the like) transmit sectors are also trained. Furthermore, an SSW-Feedback field may be included in a probe and/or an association frame. Furthermore, when DM=1, a discovery response frame may be transmitted by stations to a PCP/AP with SSW— Feedback and receive RX-TRN fields to trigger a probe request frame from the PCP/AP.

Those skilled in the art will appreciate that in some implementations, the functionality of devices 101, 102 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 102 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method in a wireless communications assembly of a first wireless communication device for establishing communications with a second wireless communication device in a wireless network, comprising:
    transmitting, during a beacon transmission interval of a beacon interval, beacon data from the first wireless communication device, the beacon data comprising: beacon data parameters for operation of a basic service set: and beamforming data that includes receive beamforming training fields; and
    beamforming with the second wireless communication device.

2. The method of claim 1, wherein the beamforming data is appended to the beacon data parameters.

3. The method of claim 1, further comprising: receiving, from the second wireless communication device, a response to the beacon data in a data transmission interval of the beacon interval after an association beamforming training (A-BFT) interval of the beacon interval.

4. The method of claim 3, wherein the response comprises a plurality of sector sweep frames received in the data transmission interval, each of the plurality of sector sweep frames including respective receive beamforming training fields.

5. The method of claim 4, further comprising: transmitting, to the second wireless communication device, during the data transmission interval, feedback to the plurality of sector sweep frames.

6. The method of claim 1, wherein the beacon data further comprises header data defining a structure of the beamforming data.

7. The method of claim 1, further comprising transmitting A-BFT grants in a data transmission interval of the beacon interval.

8. The method of claim 1, further comprising receiving sector sweep (SSW) frames from the second wireless communication device in a data transmission interval of the beacon interval, the SSW frames including respective receive beamforming training fields, and transmitting feedback data to the second wireless communication device in response.

9. The method of claim 1, further comprising transmitting, to the second wireless communication device, one or more of a probe response frame, a probe request frame, an association response frame and an association request frame, each of which include one or more of respective sector sweep feedback and respective receive beamforming training fields.

10. The method of claim 1, wherein the beacon transmission interval occurs prior to an association beamforming training (A-BFT) interval of the beacon interval.

11. A wireless communications assembly of a first wireless communication device for establishing communications with a second wireless communication device in a wireless network, the wireless communications assembly comprising:
    a controller and an antenna array, the controller configured to:
        transmit, during a beacon transmission interval of a beacon interval, beacon data from the first wireless communication device, the beacon data comprising: beacon data parameters for operation of a basic service set: and beamforming data that includes receive beamforming training fields; and
        beamform with the second wireless communication device.

12. The wireless communications assembly of claim 11, wherein the beamforming data is appended to the beacon data parameters.

13. The wireless communications assembly of claim 11, wherein the controller is further configured to: receive, from the second wireless communication device, a response to the beacon data in a data transmission interval of the beacon interval after an association beamforming training (A-BFT) interval of the beacon interval.

14. The wireless communications assembly of claim 13, wherein the response comprises a plurality of sector sweep frames received in the data transmission interval, each of the plurality of sector sweep frames including respective receive beamforming training fields.

15. The wireless communications assembly of claim 14, wherein the controller is further configured to: transmit, to the second wireless communication device, during the data transmission interval, feedback to the plurality of sector sweep frames.

16. The wireless communications assembly of claim 11, wherein the beacon data further comprises header data defining a structure of the beamforming data.

17. The wireless communications assembly of claim 11, wherein the controller is further configured to: transmit A-BFT grants in a data transmission interval of the beacon interval.

18. The wireless communications assembly of claim 11, wherein the controller is further configured to: receive sector sweep frames from the second wireless communication device in a data transmission interval of the beacon interval, the sector sweep frames including respective receive beamforming training fields, and transmitting feedback data to the second wireless communication device in response.

19. The wireless communications assembly of claim 11, wherein the controller is further configured to: transmit, to the second wireless communication device, one or more of a probe response frame, a probe request frame, an association response frame and an association request frame, each of which include one or more of respective sector sweep feedback and respective receive beamforming training fields.

20. The wireless communications assembly of claim 11, wherein the beacon transmission interval occurs prior to an association beamforming training interval (A-BFT) of the beacon interval.

* * * * *